Sept. 11, 1951  J. W. KLOPP ET AL  2,567,212
HELICOPTER ATTITUDE INDICATOR
Filed Sept. 10, 1948  2 Sheets-Sheet 1
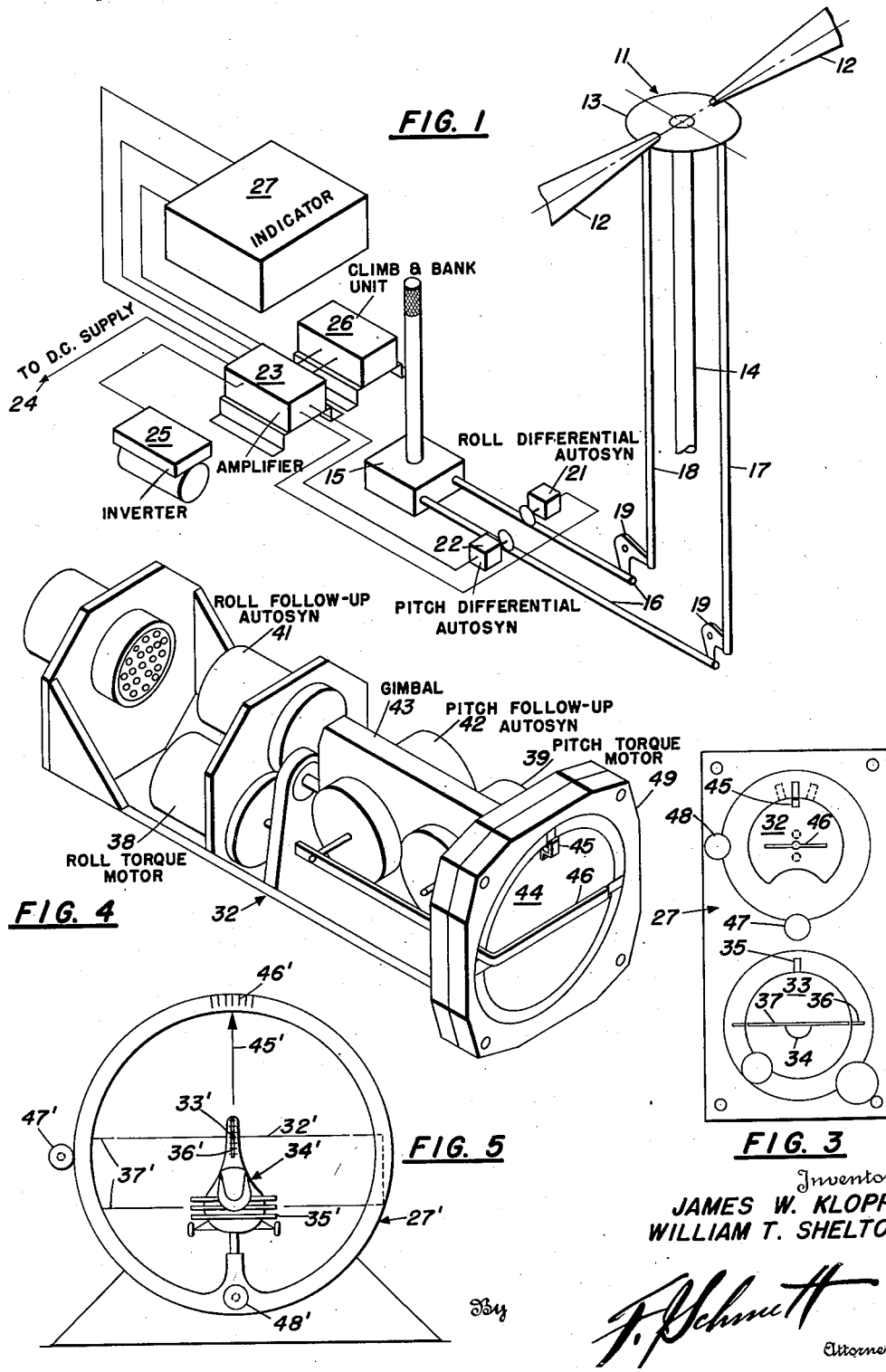
Inventors
JAMES W. KLOPP
WILLIAM T. SHELTON
Attorney

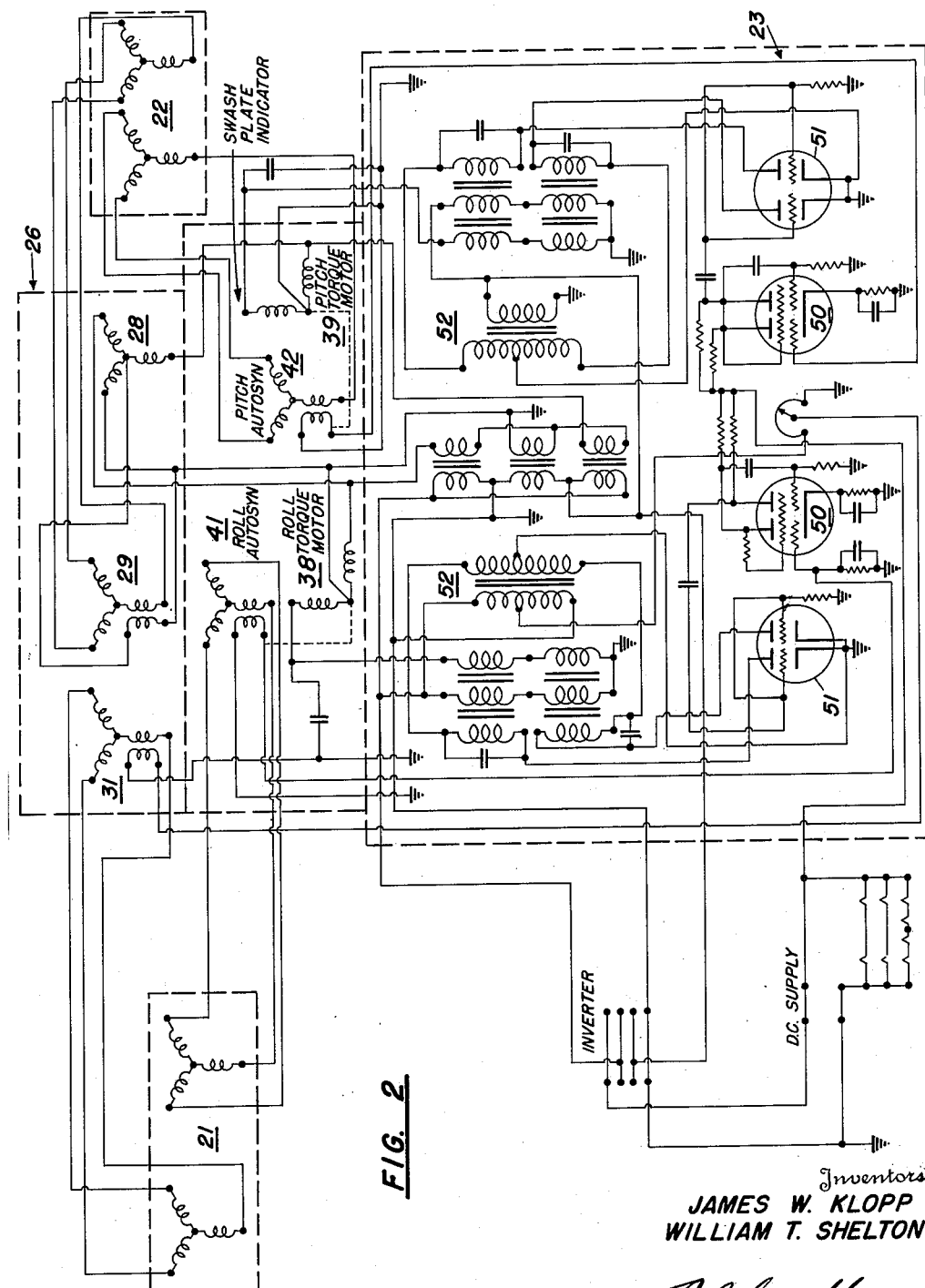

Patented Sept. 11, 1951

2,567,212

UNITED STATES PATENT OFFICE 2,567,212

HELICOPTER ATTITUDE INDICATOR

James W. Klopp and William T. Shelton,
United States Navy

Application September 10, 1948, Serial No. 48,548

6 Claims. (Cl. 244—17.11)

(Granted under the act of March 3, 1883, as amended April 30, 1928; 370 O. G. 757)

The present invention relates to a helicopter attitude indicator and more particularly to a helicopter attitude indicator that will indicate the attitude of the swash plate of a helicopter relative to the horizon for the purpose of enabling instrument flight in helicopters.

Because of the inherently unstable characteristics of the helicopter, instrument flight with present aircraft instruments is a very difficult and hazardous operation, especially in hovering flight. Indicating the attitude of the fuselage has proved to be an insufficient reference for the pilot in controlling the helicopter due to the inherent lag in the response of the craft to the conventional control mechanism. Thus, in piloting a helicopter, the control stick is displaced in the normal manner inclining the plane of the rotor disc and thereby imposing a pitching or rolling moment on the fuselage. The difficulty arises from the fact that the pilot must release the corrective pressure on the stick before the fuselage returns to its proper attitude or an overcontrol condition will result.

Similarly, in hovering flight, the helicopter will move horizontally towards the direction of tilt of the rotor disc. If the helicopter falls off in a certain direction, this motion is checked and the opposite control force must be released before the helicopter starts in the opposite direction. Actually, due to the inertia of the suspended fuselage, the motion of the fuselage must be anticipated by the pilot or oscillating conditions will result. Thus, it seems apparent that the analysis of the problem of instrument flying for helicopters entails certain difficulties that cannot be overcome by the use of conventional aircraft instruments.

In approaching the problem of developing an attitude indicator, it was necessary to become familiar with the principles and the mechanics involved in helicopter flight. Investigation revealed that the aircraft is controlled by means of a pitch stick, a cyclic pitch stick, and rudder pedals. The pitch stick is used to control pitch, or the angle of attack, of the main rotor blades. By proper manipulation of the pitch stick the craft is made to ascend, descend or hover, the throttle being generally mounted on this stick.

The cyclic pitch stick is used to control the attitude of the tilt or swash plate which determines the direction of flight of the helicopter. Thus, when the stick is moved forward, the swash plate is tilted down at the forward end and the helicopter will fly forward. Likewise, the helicopter can be made to fly backward or sideward by moving the stick backward or sideward. It will be seen that with this arrangement the swash plate can be tilted in any direction by the appropriate movement of the stick and that the helicopter will fly in accordance with the attitude of the swash plate.

The rudder pedals are used for controlling the heading of the helicopter in azimuth.

From these considerations it is apparent that the direction of flight of the helicopter is affected only by the attitude of the swash plate and is independent of the heading of the craft. However, it was noted that in flight there were instances when the attitude of the swash plate relative to the horizon was not the same as the attitude of the fuselage relative to the horizon, particularly when the helicopter was hovering. Therefore, it was concluded that instrument flight in helicopters might be possible of the attitude of both the swash plate and the fuselage relative to the horizon were available to the pilot.

An object of the present invention is the provision of a system for enabling instrument flight in helicopters.

Another object is to provide a system for indicating the attitude of a helicopter relative to the horizon.

A further object of the invention is the provision of a system for indicating the attitude of both the swash plate and the fuselage of a helicopter relative to the horizon.

A still further object is to provide an instrument for indicating directly the attitude of the helicopter relative to the horizon.

The exact nature of this invention as well as other objects and advantages thereof will be readily apparent from consideration of the following specification relating to the annexed drawing in which:

Fig. 1 is a schematic view partly in perspective illustrating the control mechanism of the present invention.

Fig. 2 is a circuit diagram for the electrical components of the control mechanism of Fig. 1.

Fig. 3 is a front elevational view of one form of indicator shown in Fig. 1.

Fig. 4 is a view in perspective, partly broken away, illustrating the swash plate indicator mechanism of Fig. 3; and Fig. 5 is a view similar to Fig. 3 illustrating another form of indicator.

Referring now to the drawings, wherein like reference characters designate like or corresponding parts throughout the several views, there is shown in Fig. 1 a main rotor 11 for a helicopter, not shown, the rotor 11 comprising a pair of rotor blades 12 mounted on a swash plate 13. Rotor 11 is driven through drive shaft 14 by means of an engine, not shown, it being understood that any suitable propulsion mechanism may be used as the engine.

The attitude of rotor 11, and thereby the helicopter, is controlled by means of cyclic pitch control stick assembly 15 through any suitable connections, one type of which is shown for purposes of illustration. The connection illustrated comprises a pair of rods 16 suitably connected to control stick assembly 15 and to push-pull tubes 17, 18 by means of links 19, push-pull tubes 17 and 18 controlling the pitch and the roll of swash plate 13, respectively.

Connected to control stick assembly 15, preferably to rods 16 in 1:1 ratio, are a pair of conventional differential autosyns 21, 22 for indicating roll and pitch, respectively, the purpose of which will be more fully described in connection with the circuit diagram of Fig. 2. The output of each of the autosyns 21, 22 is connected to an amplifier 23, which is more fully disclosed in Fig. 2. Also connected to the amplifier are a direct current supply 24 and an inverter 25, the inverter being used to supply the necessary electrical energy to the complete system. Mounted on the helicopter, preferably in the fuselage, is a conventional climb and bank unit 26 which is connected to each of the autosyns 21, 22, as shown in Fig. 2, and to amplifier 23, the output of amplifier 23 being connected to an indicator 27.

Referring now to Fig. 2 for a more complete description of the elements of the circuit, climb and bank unit 26 comprises an electrically driven gyroscope 28 having a vertical spin axis, gyroscope 28 being electrically connected to autosyn type pick-offs 29, 31 for the pitch and roll axis of the fuselage, respectively. The purpose of unit 26 is to supply a visual reference of the attitude of the fuselage and also to supply electrical signals in accordance with the relative attitude between the fuselage and the horizontal in both the pitch and roll axes.

The outputs of pick-offs 29, 31 are supplied to the corresponding differential autosyns 22, 21 and are there modified by the effects of rods 16, 16 on their corresponding autosyns. This modification in effect is the algebraic addition of the swash plate angle relative to the fuselage and the fuselage angle relative to the horizon thereby producing an output signal for each differential autosyn 21, 22 which corresponds to the attitude of the swash plate 13 relative to the horizon.

Referring now to Fig. 3 wherein is shown one form of indicator which may be used in the system of the present invention, indicator 27 comprises two indicator sections, a swash plate indicator 32 and a fuselage or helicopter indicator 33. Indicator 33 is connected to the output side of unit 26 whereby a visual indication of the attitude of the aircraft is noted by the position of the miniature airplane 34 with respect to the roll index 35 and the pitch index 36 of the indicator, horizontal bar 37 being always parallel to the natural horizon.

Swash plate indicator 32 (see Fig. 4) comprises a pair of torque motors 38, 39 geared to follow-up autosyns 41, 42, respectively, preferably through a gear reduction ratio of 200:1, one motor and its corresponding follow-up autosyn being used for each axis of indication, that is roll and pitch. Motor 39 and its associated autosyn 42 are mounted on gimbal 43 which is preferably ball-bearing mounted and is free to rotate through approximately 135° either side of center. Motor 38 and its associated autosyn 41 are mounted in a fixed position relative to the instrument case, the gimbal 43 being directly coupled to motor 38 whereby this motor causes gimbal 43 to rotate about its horizontal axis.

Dial plate 44 is mounted directly to gimbal 43 and supports a peripheral roll indicator 45, the dial plate offering a suitable back drop for the instrument face. Indicator bar 46, actuated by motor 39, sweeps across the face of dial plate 44 giving an indication of the attitude of the swash plate 13 in the fore and aft plane. By virtue of gimbal 43 bar 46 is made to tilt laterally whenever motor 38 is driven, thus presenting a true picture of the attitude of the swash plate. Two external knobs 47, 48 (Fig. 3) are set in bezel 49 by making it possible to adjust the pitch and roll indices, respectively, to suit the particular loading condition of the helicopter. Thus, in swash plate indicator 32, bar 46 represents the attitude of the swash plate and the indices on the case correspond to the horizontal.

Follow-up autosyns 41, 42 of indicator 32 are connected back to back with autosyns 21, 22 respectively, (Fig. 2), whereby the rotor of each follow-up autosyn will produce a signal in accordance with the attitude of the swash plate 13 relative to the horizon. The output signal from each follow-up autosyn is then applied to its corresponding channel of the two-channel amplifier 23, each of the channels consisting of a two-stage amplifier 50 and a discriminator 51. The output of each discriminator 51 is supplied to the control windings of a magnetic amplifier 52, the output of which is used to energize the variable phase of the corresponding one of the torque motors 38, 39. By this arrangement, whenever the indication of the swash plate indicator 32 does not agree with the attitude of the swash plate 13 a signal is fed to the amplifier 23 and the amplified signal will cause the appropriate torque-motor to drive the autosyn back to its null position.

Referring now to Fig. 5, there is shown an indicator 27' which embodies both indications, that is of the swash plate and of the helicopter, on the same instrument. Indicator 27' may be used in place of indicator 27 (Figs. 3 and 4) and is preferable thereover since the pilot of the helicopter may note on one instrument the attitude of the swash plate and the fuselage relative to the horizon, thereby enabling him to better control the helicopter by instrument.

Indicator 27' is mounted on the fuselage and comprises a horizon bar 37'; a miniature craft 34'; a swash plate bar 32' slidable and pivoted at 33' to craft 34', a knob 47' for aligning the swash plate bar 32' with the horizon bar 37'; and a knob 48' for setting the horizon bar 37' level with the craft 34', pointer 45' and scale 46' being used for this purpose. Knobs 47' and 48' are used to obtain a zero setting for the instrument while the helicopter is maintained in a hovering position, preferably at a small distance above the ground. Craft 34' has a pair of scales marked thereon, scale 35' being used to indicate the attitude of the fuselage of the helicopter with respect to the horizon bar 37' and scale 36' being used to indicate the attitude of swash plate bar 32' in fore and aft translational flight.

By fixing indicator 27', and therefore craft 34', to the fuselage, and by making horizon bar 37' fixed relative to the horizon, as is horizon bar 37, no signal from the primary source need be introduced to control the position of craft 34', and therefore the indication of the fuselage, relative to the horizon bar 37'. If the helicopter climbs or descends, miniature craft 34' and indicator 27', which are both mounted on the fuselage, will nose upwardly or downwardly with respect to horizon bar 37'. If the helicopter banks to the right or to the left a corresponding banking will occur upon indicator 27' between craft 34' and horizon bar 37'. Thus the indicator 27' will present an instantaneous picture of the position of the fuselage, and thereby the helicopter, with respect to the horizon.

Since swash plate bar 32' is supported on the craft 34', bar 32' will also move into a corresponding position with respect to the horizon. However, upon movement of control stick assembly 15, an additional movement is imparted to bar 32' in accordance with the displacement of assembly 15, and therefore the swash plate, relative to the fuselage. This is attained by coupling bar 32' to the signal source in the same manner as indicator 32 of the first embodiment, that is motor 38 controls pivotal movement, while motor 39 controls up and down movement, of bar 32' relative to craft 34', and therefore the fuselage. However, since craft 34' indicates the position of the fuselage relative to the horizon, no correction need be made for the position of the fuselage relative to the horizon in the signal supplied to motors 38 and 39. In other words, autosyns 21 and 22 are directly responsive to the movements of assembly 15 in this embodiment. The final result is the superposition on craft 34' of the attitude of the swash plate relative to the fuselage. Thus, it seems clear that if it is desired to maintain the helicopter in straight and level flight, the pilot need only adjust the control stick 15 so as to align swash plate bar 32' with horizon bar 37'. In this manner overcontrolling of the swash plate is prevented, and the pilot can eliminate oscillations of the helicopter by maintaining the control stick in the proper position as indicated on the indicator 27'.

Obviously many modifications and variations of the present invention are possible in the light of the above teachings. It is, therefore, to be understood that, within the scope of the appended claims, the invention may be practiced otherwise than as specifically described and is applicable to any type rotary wing aircraft.

The invention described herein may be manufactured and used by or for the Government of the United States of America for governmental purposes without the payment of any royalties thereon or therefor.

What is claimed is:

1. In a helicopter comprising a fuselage, a rotor mounted on said fuselage having adjustable blades, and control means for said blades having a manually operable control member, a system for indicating to the pilot the amount of correction to be applied to said control member to maintain said helicopter in a desired flight condition, said system comprising means mounted on said fuselage for indicating the attitude of said fuselage relative to the horizon, and means on said fuselage and in visual alignment with said indicating means and responsive to the movement of said control member for simultaneously indicating the attitude of the rotor tip path plane relative to the horizon.

2. A system according to claim 1, wherein said responsive means comprises electrical means connected to said control member for producing a signal proportional to the movement of said control member.

3. A system according to claim 2, wherein said responsive means further comprises additional electrical means connected to said first-mentioned electrical means and to said fuselage indicating means for producing an indication proportional to the algebraic sum of the displacements of said control member and of said fuselage relative to the horizon.

4. In a helicopter, a fuselage, a rotor mounted on said fuselage having adjustable blades, cyclic pitch control means for said blades including a pilot operated control member, means on said fuselage for indicating the attitude of said fuselage relative to the horizon, and means responsive to the movement of said control member for superposing on said fuselage indications the attitude of the rotor relative to the horizon thereby indicating to the pilot the required manual operation of said control member to effect a desired flight of said helicopter.

5. The combination according to claim 4, wherein said superposing means comprises electrical means connected to said control member to produce a signal proportional to the attitude of said rotor relative to the fuselage.

6. The combination according to claim 4, wherein said superposing means comprises electrical means connected to said control member and to said indicating means for producing an indication proportional to the attitude of said rotor relative to the horizon.

JAMES W. KLOPP.
WILLIAM T. SHELTON.

REFERENCES CITED

The following references are of record in the file of this patent:

UNITED STATES PATENTS

| Number | Name | Date |
| --- | --- | --- |
| 1,982,636 | Carlson | Dec. 4, 1934 |
| 2,443,192 | Moeller | June 15, 1948 |